Sept. 19, 1967   W. H. SHANKS   3,341,961
PICTURE FRAME
Filed July 27, 1965

United States Patent Office 3,341,961
Patented Sept. 19, 1967

3,341,961
PICTURE FRAME
Walter H. Shanks, 729 Marsh Ave., Reno, Nev. 89502
Filed July 27, 1965, Ser. No. 475,193
2 Claims. (Cl. 40—158)

The present invention relates to picture frames, and more particularly to a single piece frame or mount provided with adhesive on its rear surface for securing the photograph or art work to be framed.

With the increased public interest in hobbies such as photography, painting, drawing, etc., there has arisen an increased need for relatively inexpensive, yet decorative frames for mounting photographs, art work and other pictorial elements. The currently available decorative frames, however, are relatively expensive, and the less expensive frames are rather plain and thus do not enhance the appeal of the pictorial elements mounted therein. It is one of the objects of the present invention to provide a relatively inexpensive, yet decorative frame for mounting various types of pictorial elements.

When it is desired to mount currently available frames on a flat surface, such as a photo album page or a wall, additional mounting materials, such as nails, hangers, paste or the like must be used. It is a further object of this invention to provide a single piece frame which may itself be mounted on an album page or any other desired surface without the use of additional mounting materials.

The foregoing objects have been realized by providing a decorative single piece frame having its rear surface covered with an adhesive substance for holding the pictorial element to be framed. Scored or embossed lines may be provided on the rear surface for helping the user to accurately align the pictorial element when mounting it, and a protective backing sheet may be employed to preserve the quality of the adhesive substance until it is desired to mount the pictorial element.

The foregoing and other objects, features and advantages of the invention will be apparent from the following more particular description of a preferred embodiment of the invention, as illustrated in the accompanying drawings.

Figure 1:
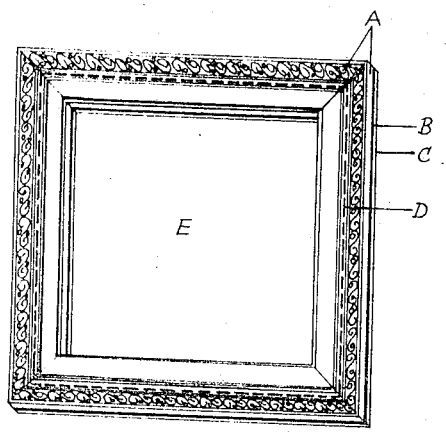
FIGURE 1 is a front elevation of a decorative, single piece frame constructed in accordance with the teachings of the present invention.
Figure 3:
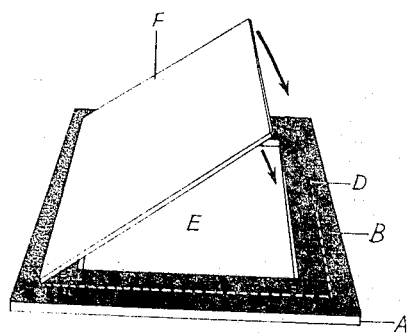
FIGURE 3 shows perspective views looking at the back and front 3A of the frame shown in FIGURES 1 and 2 with the protective backing removed and with a pictorial element mounted thereon.
Figure 3A:
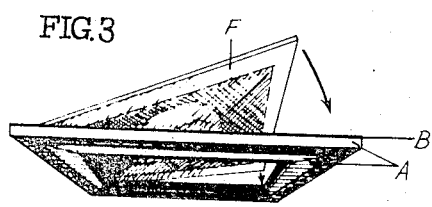
Figure 4:
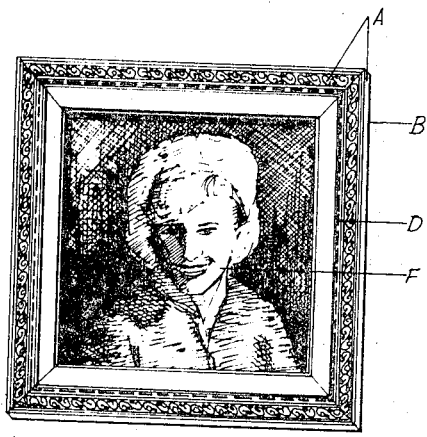
FIGURE 4 illustrates a front elevation and a perspective view 4A of the frame shown in FIGURES 1–3 with a pictorial element mounted thereon.

Referring now to the drawings, it is seen that the frame of the present invention comprises a single piece A having a decorative design on its front surface (FIGURES 1 and 4). The design may be painted on the frame, or an actual photograph of a wood, plastic, ceramic, or metal frame may be transferred photographically to a sensitized plate or screen and reproduced on the frame by any suitable printing method. The frame may be made of paper, cardboard, plastic or any other material that will receive a printed image. An opening E is cut in the frame for viewing the pictorial element F mounted thereon (FIGURES 3 and 4). While both the frame and the opening E are illustrated as having square configurations, it is contemplated, of course, that either may be designed in any desired configuration.

Figure 2:
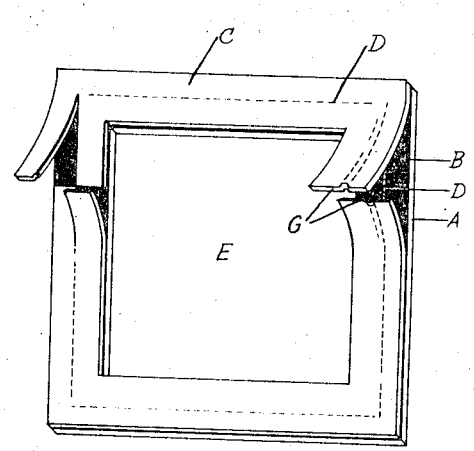
FIGURE 2 illustrates a rear elevation and a perspective view 2A of the frame shown in FIGURE 1.
Figure 4A:
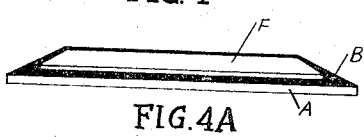

As shown in FIGURES 2, 3 and 4a, the rear surface of the frame A is coated with a suitable adhesive substance B so that the borders of the pictorial element F may be adhesively secured to the rear surface of the frame. The adhesive B may be a pressure-sensitive adhesive material, in which case the back surface of the frame may be covered with a protective backing C (FIGURE 2) for preserving the quality of the adhesive until it is desired to mount the pictorial element. Alternatively, the adhesive may be a dry coating of an adhesive material, such as an animal glue which can be temporarily softened by wetting, or a temperature-sensitive adhesive material such as cyclized rubber, polyvinyl acetate or nitrocellulose which softens when heated to a temperature appreciably above normal atmosphere temperatures. If such a dry coating of adhesive is employed, the protective backing C need not be used.

Scored lines D are embossed on the back surface of the frame between the opening E and the outer peripheral edge of the frame A and extend through the protective backing sheet C and the adhesive layer B. These lines divide the rear surface into inner and outer areas, and serve as indicia to facilitate accurate alignment of the pictorial element F on the frame (see FIGURE 3).

Figure 2A:

As seen in FIGURES 2 and 2A, a transverse cut G extends through the backing sheet C and intersects the embossed scored lines D at right angles thereto. This cut severs the backing sheet into two sections and allows the user to flex the frame and grasp one of the corners of the backing sheet to peel it from the adhesive covered rear surface. The embossed scored lines D which extend through the backing sheet, weakens the backing sheet therealong. This allows the backing sheet to be torn along the indicia line to selectively expose either the inner or outer adhesive covered rear surface. A user may thus remove only the inner portion of the protective backing by flexing the frame and grasping the inner corner revealed by the transverse cut and then tearing the backing sheet along the indicia line D. In this manner, only the inner portion of the adhesive covered rear surface is exposed to allow the picture to be secured to the frame but not exposing the outer adhesive covered rear surface. In a similar manner, the user, when not desiring the frame to adhere to the pictorial element, may remove only the outer portion of the backing sheet by grasping the outer corner revealed by the transverse cut when the frame is flexed and then tearing the backing along the indicia line D. This allows only that portion of the adhesive which is to adhere to the flat display surface to be exposed. Of course, the user may remove the entire backing to allow both the inner and outer adhesive areas to be exposed.

As shown in FIGURE 4A, after a pictorial element F is mounted on the rear surface of the frame A with the backing completely removed there will still remain an outer border of adhesive material on the rear surface around the peripheral edge of the pictorial element. This border of adhesive may be employed to secure the frame A on a photo album page, a wall, or any other flat surface.

In use, when it is desired to mount a pictorial element F in the frame A, the protective backing sheet C is first removed. The peripheral edges of the pictorial element are then aligned with the scored lines D (FIGURE 3) and the borders of the pictorial element are pressed against the pressure-sensitive adhesive coating B. The pictorial element F may then be viewed from the front of the frame through the opening E (FIGURE 4) (upper view), and the decorative front surface of the frame will serve to enhance the appearance thereof. The frame may be mounted in any type of display holder, such as an identification sleeve, a portfolio, a bound book, a single or multiple display piece, etc.

While the pictorial element F is shown in the drawings as being a photograph, it is contemplated, of course, that any suitable graphic representation may be mounted in the frame of this invention.

As can be seen from the foregoing, this invention provides a decorative, yet relatively inexpensive frame which will enhance the appearance of any photograph, art work, or the like mounted therein.

While the invention has been particularly shown and described with reference to a preferred embodiment thereof, it will be understood by those skilled in the art that various changes in form and details may be made without departing from the spirit and scope of the invention.

What is claimed is:

1. A frame for mounting substantially flat pictorial elements such as photographs, and the like, comprising:
    a single piece frame member having an outer peripheral edge,
    a front surface,
    a rear surface, and
    an inner peripheral edge defining an opening therein;
    said front surface having a decorative design thereon;
    said rear surface being substantially covered with a pressure-sensitive adhesive material;
    a removable protective backing sheet covering said adhesive;
    indicia comprising scored lines extending through said removable protective backing and defining on said adhesive covered rear surface inner and outer areas for indicating proper placement of a pictorial element to be mounted thereon;
    said inner area being adapted to retain the peripheral edge of a pictorial element; and
    said outer area being adapted to secure said frame member on a substantially flat display surface.

2. A frame according to claim 1 further comprising at least one transverse cut through said backing sheet intersecting said embossed scored indicia lines at right angles thereto whereby said protective backing may be removed by grasping a corner of said backing sheet adjacent said transverse cut and separating said backing from said adhesive covered rear surface along said severing line and tearing said backing along said embossed scored indicia lines to selectively expose the inner or outer areas of said adhesive covered rear surface.

References Cited

UNITED STATES PATENTS

| | | | |
|---|---|---|---|
| 1,845,327 | 2/1932 | Paget | 40—158 |
| 2,495,142 | 1/1950 | Seary | 40—158 |
| 2,835,062 | 5/1958 | Greene et al. | 40—158 |
| 3,024,553 | 3/1962 | Rowley | 40—158 |

LAWRENCE CHARLES, *Primary Examiner.*

EUGENE R. CAPOZIO, *Examiner.*

W. J. CONTRERAS, *Assistant Examiner.*